US009149100B2

(12) United States Patent
Marshall et al.

(10) Patent No.: US 9,149,100 B2
(45) Date of Patent: Oct. 6, 2015

(54) CASE FOR A PORTABLE ELECTRONIC DEVICE

(71) Applicant: ACCO Brands Corporation, Lake Zurich, IL (US)

(72) Inventors: Barry Marshall, Santa Clara, CA (US); Adam Weaver, Jackson, CA (US); James Kao, Newark, CA (US); Todd Robinson, Belmont, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 199 days.

(21) Appl. No.: 13/960,983

(22) Filed: Aug. 7, 2013

(65) Prior Publication Data
US 2015/0041341 A1 Feb. 12, 2015

(51) Int. Cl.
*A45C 11/00* (2006.01)
*G06F 1/16* (2006.01)
*G06F 3/02* (2006.01)

(52) U.S. Cl.
CPC ............. *A45C 11/00* (2013.01); *G06F 1/1633* (2013.01); *G06F 1/1666* (2013.01); *G06F 1/1667* (2013.01); *G06F 3/0221* (2013.01); *A45C 2011/003* (2013.01)

(58) Field of Classification Search
CPC .................. A45C 2011/002; A45C 2011/003; A45C 11/00
USPC ............................. 206/45.2, 320; 361/679.56
See application file for complete search history.

(56) References Cited

U.S. PATENT DOCUMENTS

| 4,213,520 | A |   | 7/1980  | Sarna et al.        |
|-----------|---|---|---------|---------------------|
| 5,105,338 | A |   | 4/1992  | Held                |
| 5,109,354 | A |   | 4/1992  | Yamashita et al.    |
| 5,128,829 | A |   | 7/1992  | Loew                |
| 5,335,141 | A |   | 8/1994  | Hosoi               |
| 5,375,076 | A |   | 12/1994 | Goodrich et al.     |
| 5,435,437 | A | * | 7/1995  | Sasaki ........ 206/45.23 |
| 5,445,266 | A | * | 8/1995  | Prete et al. ...... 206/320 |
| 5,481,430 | A |   | 1/1996  | Miyagawa et al.     |
| 5,483,418 | A |   | 1/1996  | Hosoi               |
| 5,594,619 | A |   | 1/1997  | Miyagawa et al.     |
| 5,607,054 | A |   | 3/1997  | Hollingsworth       |
| 5,666,265 | A |   | 9/1997  | Lutz et al.         |

(Continued)

OTHER PUBLICATIONS

Extended European Search Report from the European Patent Office for Application No. 14176385.4 dated Dec. 19, 2014 (8 pages).

*Primary Examiner* — Steven A. Reynolds
*Assistant Examiner* — King M Chu
(74) *Attorney, Agent, or Firm* — Michael Best & Friedrich LLP

(57) ABSTRACT

A case for a portable electronic device and a keyboard includes a first cover portion, an engagement member secured to the first cover portion and configured to support the portable electronic device, a second cover portion configured to support the keyboard, and a spine portion connecting the first cover portion to the second cover portion. The spine portion allows movement of the first cover portion relative to the second cover portion so that the case is positionable in a closed position and in an operating position. The case also includes a rigid spine component coupled to the second cover portion adjacent the spine portion. The rigid spine component includes a groove configured to receive a portion of at least one of the engagement member and the portable electronic device when the case is in the operating position.

16 Claims, 10 Drawing Sheets

(56) References Cited

U.S. PATENT DOCUMENTS

| | | |
|---|---|---|
| 6,008,983 A | 12/1999 | Yen |
| 6,109,434 A | 8/2000 | Howard, Jr. |
| 6,219,681 B1 | 4/2001 | Hawkins et al. |
| 6,229,697 B1 | 5/2001 | Selker |
| 6,301,098 B1 | 10/2001 | Kim |
| 6,356,440 B2 | 3/2002 | Selker |
| 6,480,377 B2 | 11/2002 | Genest et al. |
| 6,510,048 B2 | 1/2003 | Rubenson et al. |
| 6,829,140 B2 * | 12/2004 | Shimano et al. ......... 361/679.09 |
| 6,842,332 B1 | 1/2005 | Rubenson et al. |
| 6,856,506 B2 | 2/2005 | Doherty et al. |
| 7,042,711 B2 | 5/2006 | Tanaka et al. |
| 7,054,145 B2 | 5/2006 | Tanaka et al. |
| 7,236,356 B2 | 6/2007 | Ulla et al. |
| 7,414,833 B2 | 8/2008 | Kittayapong |
| 7,735,644 B2 * | 6/2010 | Sirichai et al. ................ 206/320 |
| 7,909,161 B2 | 3/2011 | Sween et al. |
| 8,014,139 B2 | 9/2011 | Maeda et al. |
| 8,173,893 B2 | 5/2012 | Huang |
| 8,230,992 B2 | 7/2012 | Law et al. |
| 8,244,316 B2 | 8/2012 | Lu |
| 8,312,991 B2 | 11/2012 | Diebel et al. |
| 8,328,008 B2 | 12/2012 | Diebel et al. |
| 8,467,178 B2 | 6/2013 | Probst et al. |
| 8,467,179 B2 | 6/2013 | Probst et al. |
| 8,467,183 B2 | 6/2013 | Probst et al. |
| 8,467,185 B2 | 6/2013 | Probst et al. |
| 8,720,843 B1 * | 5/2014 | Chen ............................ 248/455 |
| 8,925,722 B2 * | 1/2015 | Poon et al. .................... 206/320 |
| 2004/0011616 A1 | 1/2004 | Rasmussen |
| 2004/0159762 A1 * | 8/2004 | Ghosh .......................... 248/351 |
| 2007/0051766 A1 | 3/2007 | Spencer |
| 2008/0202959 A1 * | 8/2008 | Chu .............................. 206/320 |
| 2008/0302687 A1 | 12/2008 | Sirichai et al. |
| 2011/0199727 A1 | 8/2011 | Probst |
| 2011/0267757 A1 | 11/2011 | Probst et al. |
| 2011/0284420 A1 * | 11/2011 | Sajid ............................ 206/576 |
| 2011/0297566 A1 * | 12/2011 | Gallagher et al. ............ 206/320 |
| 2012/0037523 A1 * | 2/2012 | Diebel et al. ................. 206/320 |
| 2012/0087100 A1 | 4/2012 | Ku |
| 2012/0103921 A1 | 5/2012 | Liu |
| 2012/0106059 A1 | 5/2012 | Probst et al. |
| 2012/0106060 A1 | 5/2012 | Probst et al. |
| 2012/0106061 A1 | 5/2012 | Probst et al. |
| 2012/0106062 A1 | 5/2012 | Probst et al. |
| 2012/0106078 A1 | 5/2012 | Probst et al. |
| 2012/0110354 A1 | 5/2012 | Liu |
| 2012/0182740 A1 | 7/2012 | Vermeulen |
| 2012/0211377 A1 * | 8/2012 | Sajid ............................ 206/216 |
| 2012/0224316 A1 | 9/2012 | Shulenberger |
| 2012/0247989 A1 | 10/2012 | Cooper |
| 2012/0261304 A1 | 10/2012 | Busri |
| 2012/0293953 A1 * | 11/2012 | Wu et al. .................. 361/679.56 |
| 2012/0305413 A1 | 12/2012 | Chung |
| 2013/0016467 A1 * | 1/2013 | Ku ............................ 361/679.08 |
| 2013/0016468 A1 | 1/2013 | Oh |
| 2013/0021735 A1 | 1/2013 | Pu et al. |
| 2013/0027872 A1 | 1/2013 | Lin et al. |
| 2013/0048514 A1 * | 2/2013 | Corcoran et al. .......... 206/45.23 |
| 2013/0075281 A1 | 3/2013 | Diebel et al. |
| 2013/0083465 A1 * | 4/2013 | Motoishi et al. ......... 361/679.21 |
| 2013/0083953 A1 | 4/2013 | Chang |
| 2013/0098782 A1 | 4/2013 | Diebel et al. |
| 2013/0134061 A1 * | 5/2013 | Wu et al. ...................... 206/320 |
| 2013/0242490 A1 * | 9/2013 | Ku ............................. 361/679.3 |
| 2013/0270980 A1 | 10/2013 | Hsu |

\* cited by examiner

CASE FOR A PORTABLE ELECTRONIC DEVICE

FIELD OF THE INVENTION

The present invention relates to cases, or folios, for portable electronic devices such as tablet computers.

SUMMARY

In one embodiment, the invention provides a case for a portable electronic device and a keyboard. The case includes a first cover portion, an engagement member secured to the first cover portion and configured to support the portable electronic device, a second cover portion configured to support the keyboard, and a spine portion connecting the first cover portion to the second cover portion. The spine portion allows movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard. The case also includes a rigid spine component coupled to the second cover portion adjacent the spine portion. The rigid spine component includes a groove configured to receive a portion of at least one of the engagement member and the portable electronic device when the case is in the operating position.

In another embodiment, the invention provides a keyboard configured to communicate with the portable electronic device and a case having a first cover portion, an engagement member secured to the first cover portion and configured to support the portable electronic device, a second cover portion supporting the keyboard, and a spine portion connecting the first cover portion to the second cover portion. The spine portion allows movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard. The keyboard includes a groove configured to receive a portion of at least one of the engagement member and the portable electronic device when the case is in the operating position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
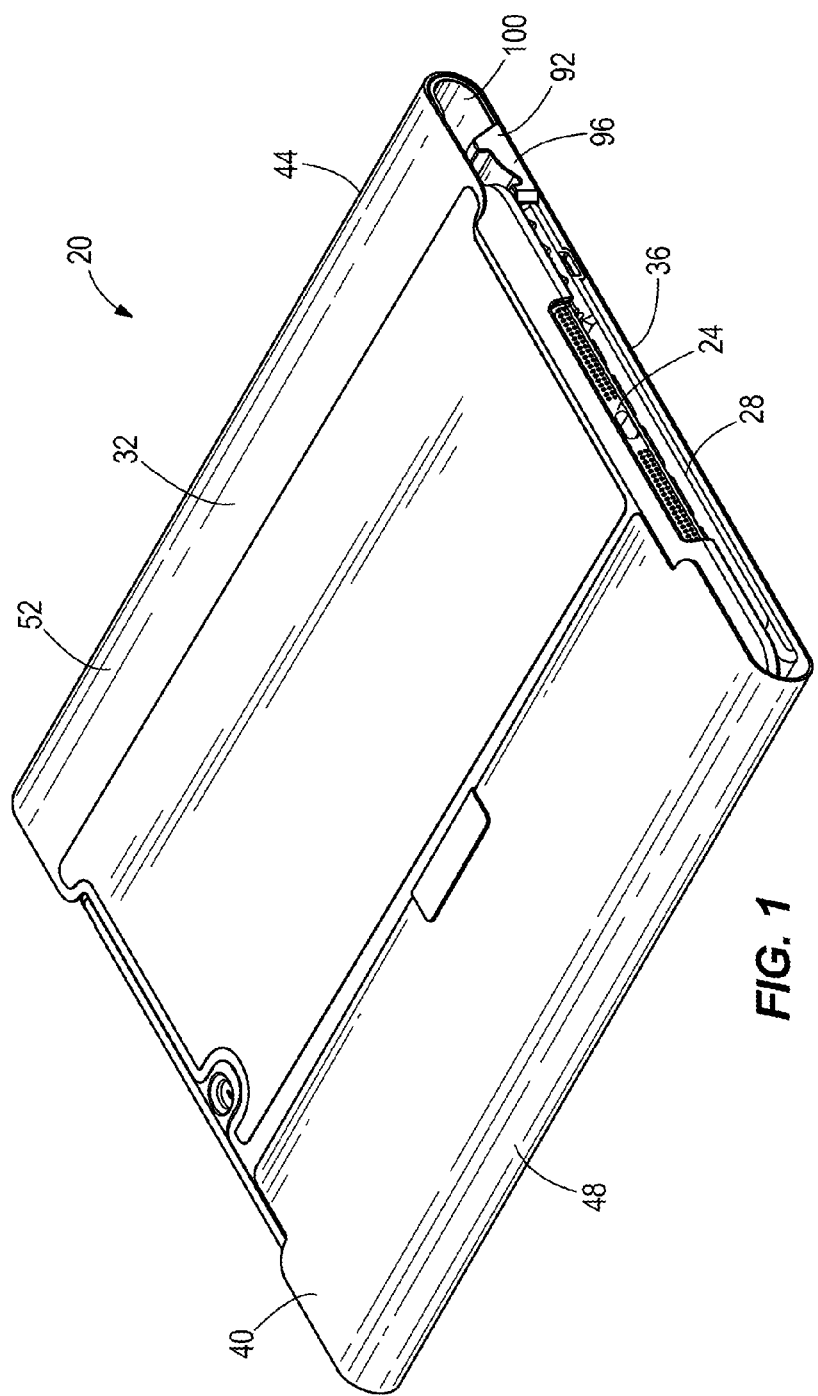
FIG. 1 is a perspective view of a case embodying the invention, the case covering a portable electronic device and a keyboard and being in a closed position.
Figure 2:
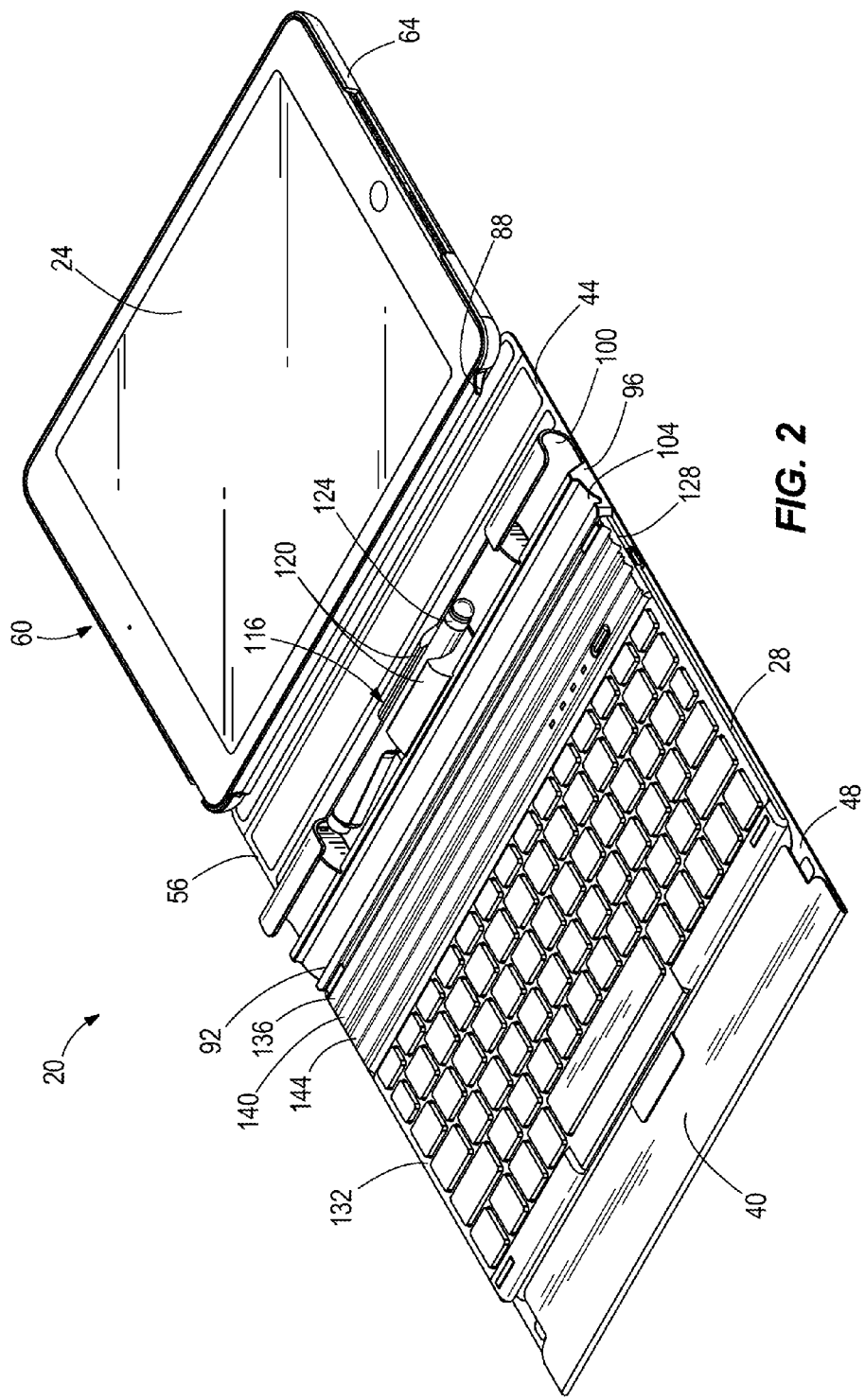
FIG. 2 is a perspective view of the case in a fully open position.

FIGS. 1 and 2 illustrate a case 20 for a portable electronic device 24 and a keyboard 28. In the illustrated embodiment, the portable electronic device 24 is a tablet computer, and the keyboard 28 is a wireless keyboard. The keyboard 28 is configured to communicate with the tablet computer 24 over a short range network (e.g., Bluetooth). In other embodiments, the keyboard 28 may be connected to the tablet computer 24 by a wired connection. When positioned within the case 20, the portable electronic device 24 and the keyboard 28 are supported and covered by the case 20.

The case 20 is movable between a closed position (FIG. 1), a fully open position (FIG. 2), and a plurality of different operating positions (FIGS. 3-13). When in the closed position, as shown in FIG. 1, the tablet computer 24 and the keyboard 28 are arranged on top of and facing each other. In this position, the case 20 substantially covers both the tablet computer 24 and the keyboard 28 such that the tablet computer 24 and the keyboard 28 are generally not accessible to a user. When in the fully open position, as shown in FIG. 2, the case 20 lies flat such that the tablet computer 24 and the keyboard 28 are arranged side-by-side and both accessible, but are spaced apart from each other. When in one of the operating positions, as shown in, for example, FIG. 3, the tablet computer 24 is supported at an oblique angle relative to the keyboard 28. In this position, the keyboard 28 is arranged to lie flat on a surface (e.g., a desk or table), and the tablet computer 24 is arranged at a desired viewing angle for a user.

The illustrated case 20 includes three cover portions 32, 36, 40 and two spine portions 44, 48. The cover and spine portions 32, 36, 40, 44, 48 are integrally formed as a thin and soft, single-piece wall or member. The cover and spine portions 32, 36, 40, 44, 48 may be composed of polyurethane and/or fabric materials. In some embodiments, the cover and spine portions 32, 36, 40, 44, 48 may be heat laminated and/or sonic welded into the thin wall or member. An outer surface 52 of the cover and spine portions 32, 36, 40, 44, 48 (i.e., the surface facing away from the portable electronic device 24 and the keyboard 28) is textured to have robust abrasion resistance and ease of grip. An inner surface 56 of the cover and spine portions 32, 36, 40, 44, 48 (i.e., the surface facing toward the portable electronic device 24 and the keyboard 28) is textured to have relatively high surface tension and friction. Due to the thin wall construction of the case 20, when closed as shown in FIG. 1, the case 20 has a total height or thickness of less than 20 millimeters.

The first cover portion 32, or panel, supports the portable electronic device 24. The second cover portion 36, or panel, supports the keyboard 28. The third cover portion 40, or panel, is a front flap that wraps around a portion of the first cover portion 32 when the case 20 is closed. The first spine portion 44 is positioned between and connects the first and second cover portions 32, 36. The second spine portion 48 is positioned between and connects the second and third cover portions 36, 40. The spine portions 44, 48 are flexible areas of the case 20 that allow movement of the cover portions 32, 36, 40 relative to each other. For example, as shown in FIG. 1, the spine portions 44, 48 allow the cover portions 32, 36, 40 to move relative to each other to the closed position such that the first cover portion 32 overlies the second cover portion 36 and the third cover portion 40 overlies the first cover portion 32. As shown in FIG. 2, the spine portions 44, 48 also allow the cover portions 32, 36, 40 to move relative to each other to the fully open position where all of the cover and spine portions 32, 36, 40, 44, 48 lay flat and parallel to each other. In addition, as shown in FIGS. 3-13, the spine portions 44, 48 allow the cover portions 32, 36, 40 to move relative to each other to the operating positions in which at least a portion of the first cover portion 32 is angled relative to the second cover portion 36 so that the portable electronic device 24 is supported at an oblique angle relative to the keyboard 28.

Figure 3:
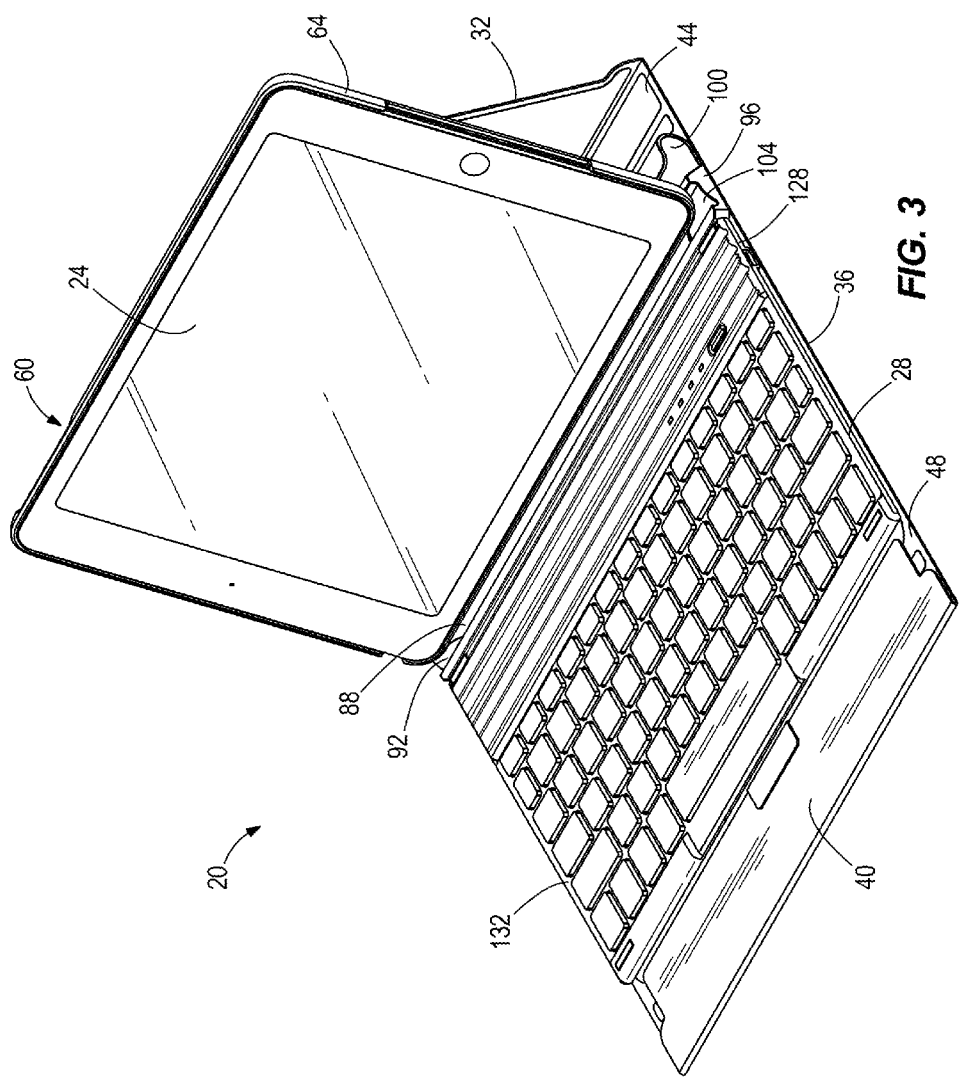
FIG. 3 is a perspective view of the case in a first operating position.
Figure 4:
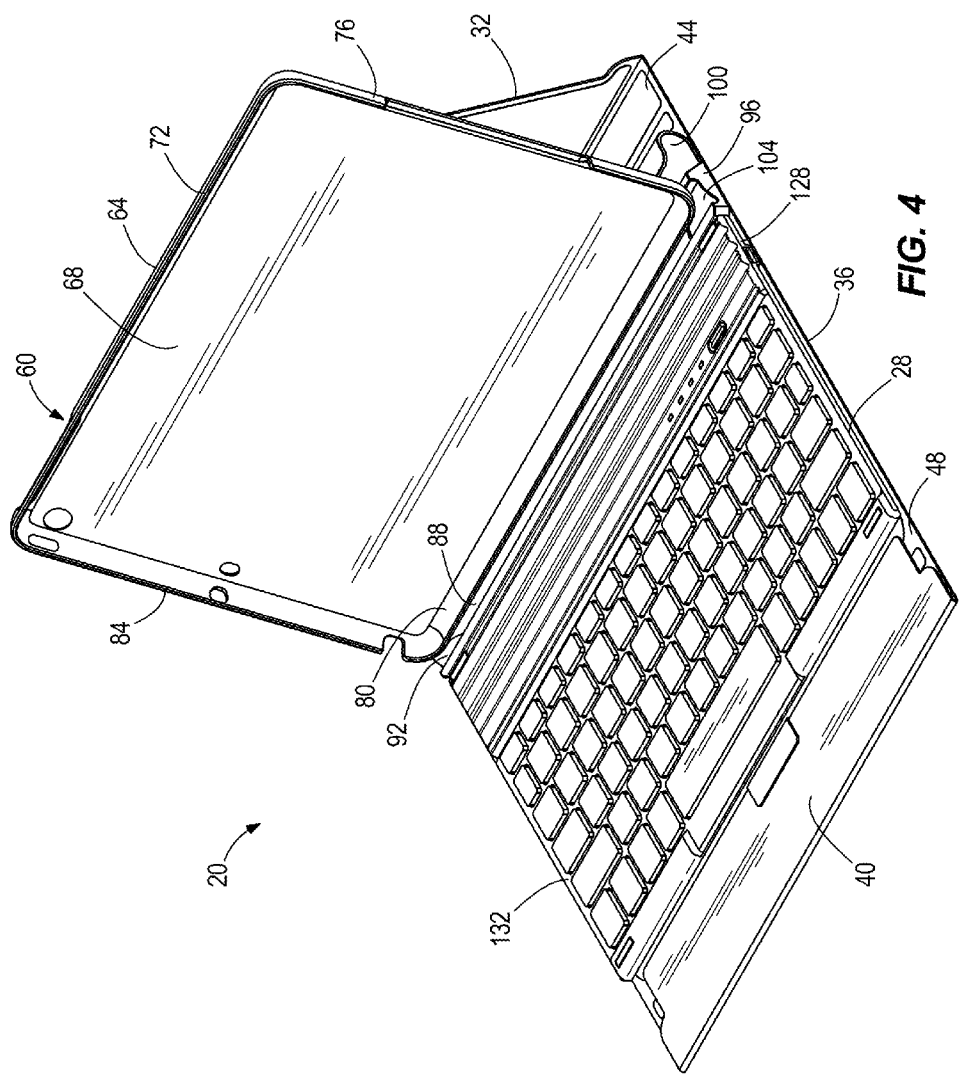
FIG. 4 is a perspective view of the case in the first operating position and with the portable electronic device removed.

As shown in FIG. 4, the case 20 also includes an engagement member 60 secured to the first cover portion 32. The engagement member 60 may be permanently secured to the inner surface 56 of the first cover portion 32 using adhesives or other suitable coupling means. The engagement member 60 engages the portable electronic device 24 (FIG. 3) to removably couple the portable electronic device 24 to the case 20. In the illustrated embodiment, the engagement member 60 includes a shell 64 that receives the portable electronic device 24. The shell 64 is a thin-walled member made of a molded plastic material (e.g., polycarbonate). The illustrated shell 64 includes a back wall 68 that extends over a back surface of portable electronic device 24 and four sidewalls 72, 76, 80, 84 that extend around an outer edge of the portable electronic device 24. The shell 64 is configured to receive the portable electronic device 24 with a snap-in type engagement. When received within the shell 64, a front surface of the portable electronic device 24 (specifically, the screen of the device 24) is fully visible and accessible to a user. In other embodiments, other suitable engagement members may also or alternatively be employed to removably couple the portable electronic device 24 to the case 20.

As shown in FIG. 2, the shell 64 includes a rib 88 formed on a bottom edge (i.e., the edge of the shell 64 closest to the second cover portion 36) of the shell 64. The illustrated rib 88 is a rounded projection that extends outwardly from one of the sidewalls 80 along almost the entire length of the bottom edge. The rib 88 facilitates supporting the first cover portion 32, and thereby the shell 64 and the portable electronic device 24, in the various operating positions (FIGS. 3-13). In some embodiments, one or more magnets may be embedded or otherwise coupled to the rib 88 such that at least a portion of the rib 88 is magnetized.

The case 20 further includes a rigid spine component 92 coupled to the second cover portion 36. The rigid spine component 92 is positioned directly adjacent the first spine portion 44 of the case 20 to help support the spine portion 44. The spine component 92 is made of a molded plastic material. In the illustrated embodiment, the rigid spine component 92 is permanently adhered to the inner surface 56 of the second cover portion 36. In other embodiments, the rigid spine component 92 may be removably coupled to the inner surface 56 of the second cover portion 36.

Figure 5:
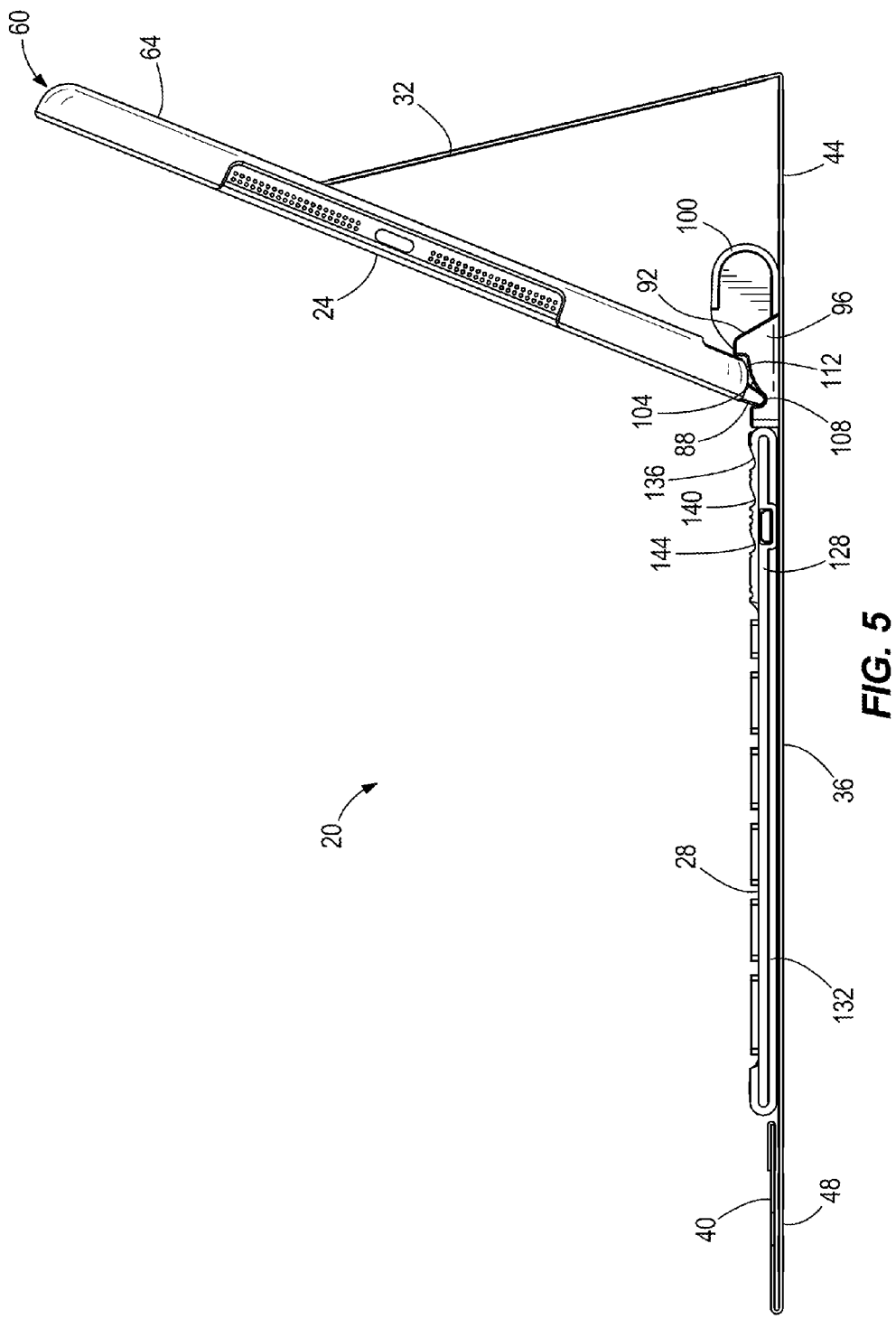
FIG. 5 is a side view of the case in the first operating position.
Figure 6:
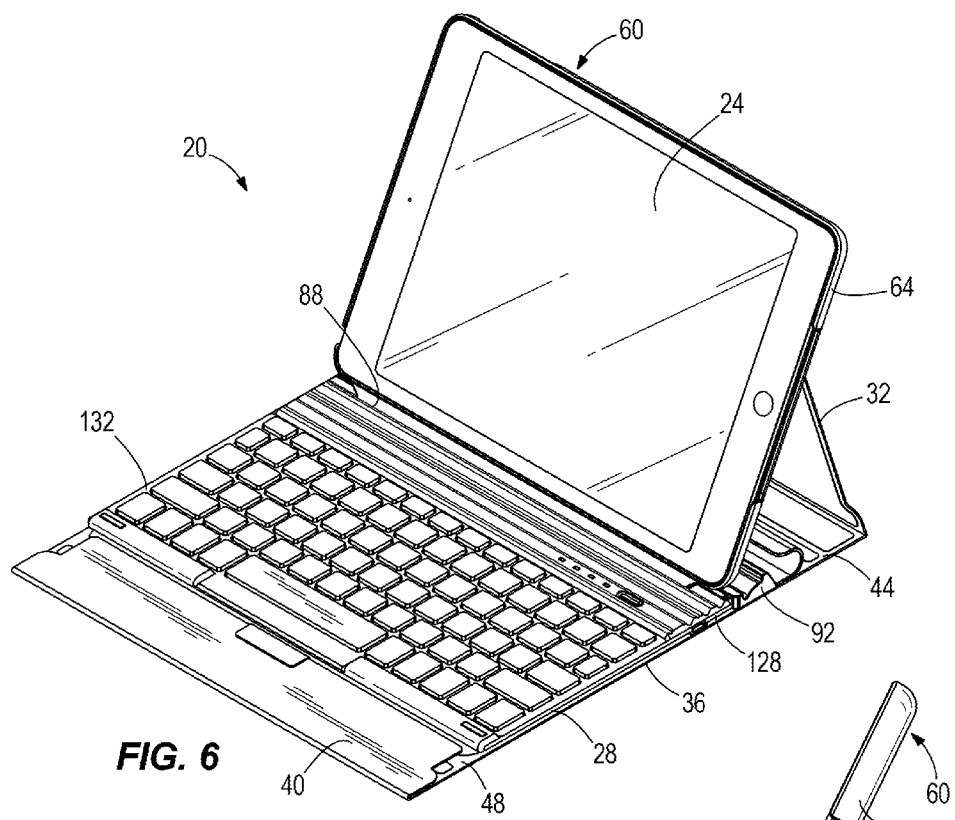
FIG. 6 is a perspective view of the case in a second operating position.
Figure 7:
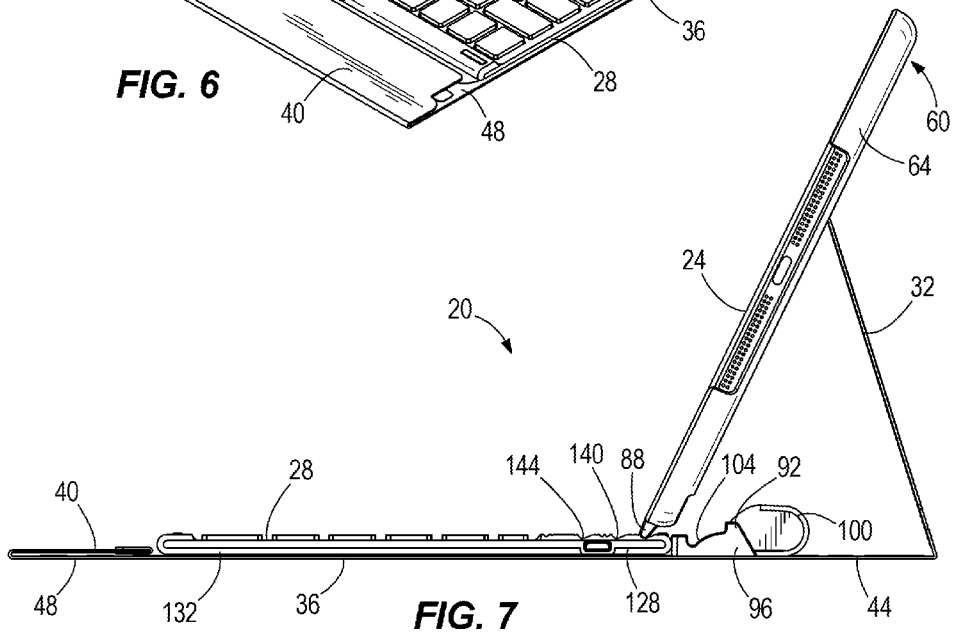
FIG. 7 is a side view of the case in the second operating position.
Figure 8:
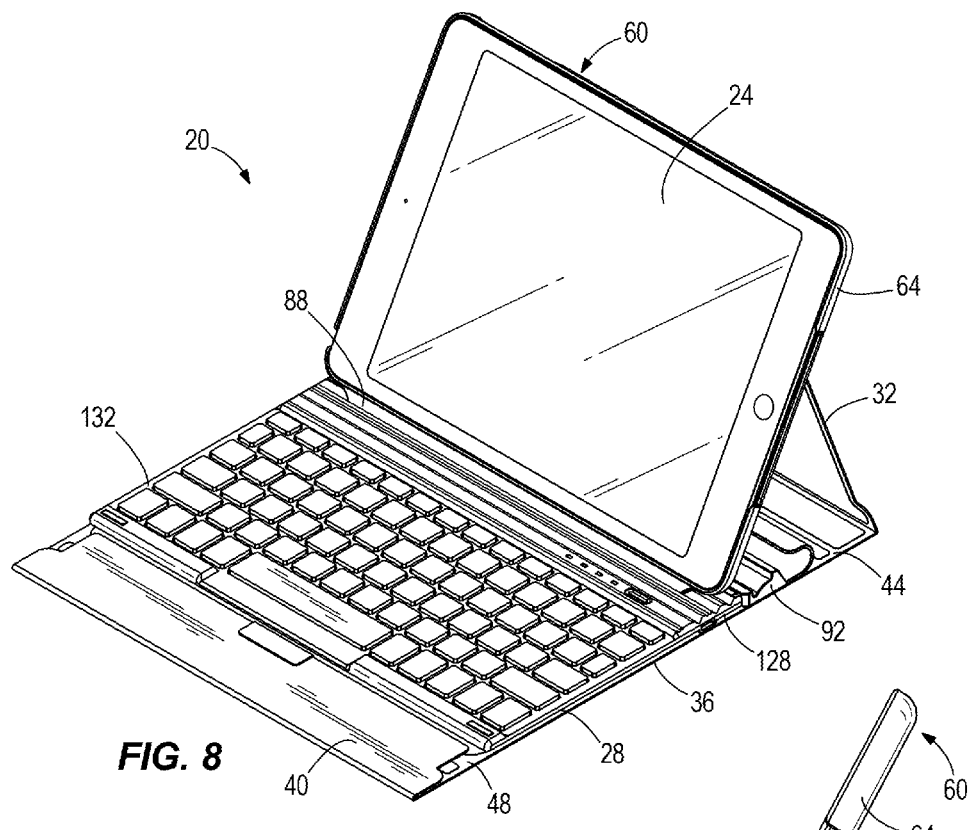
FIG. 8 is a perspective view of the case in a third operating position.
Figure 9:
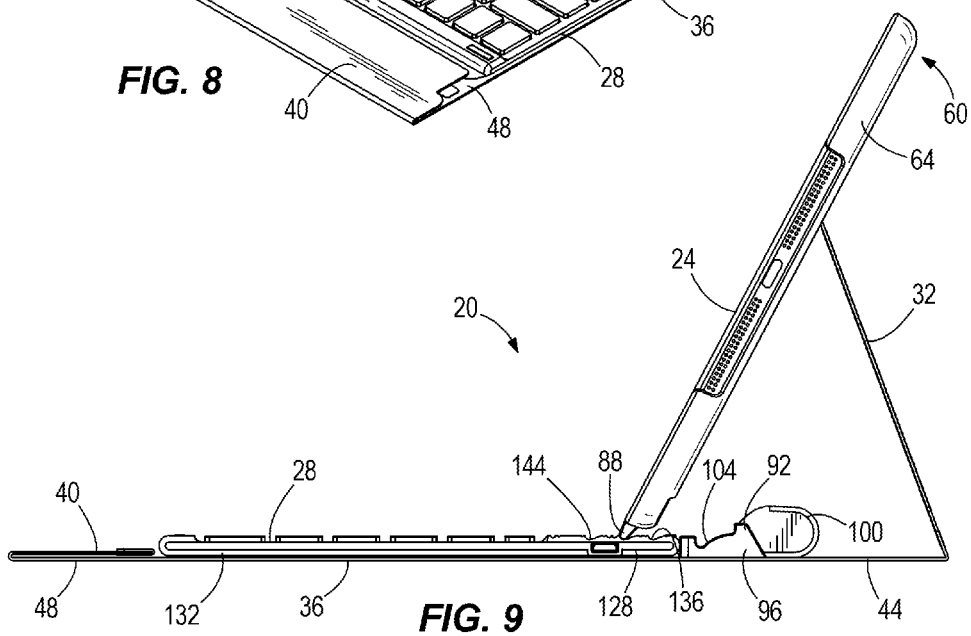
FIG. 9 is a side view of the case in the third operating position.
Figure 10:
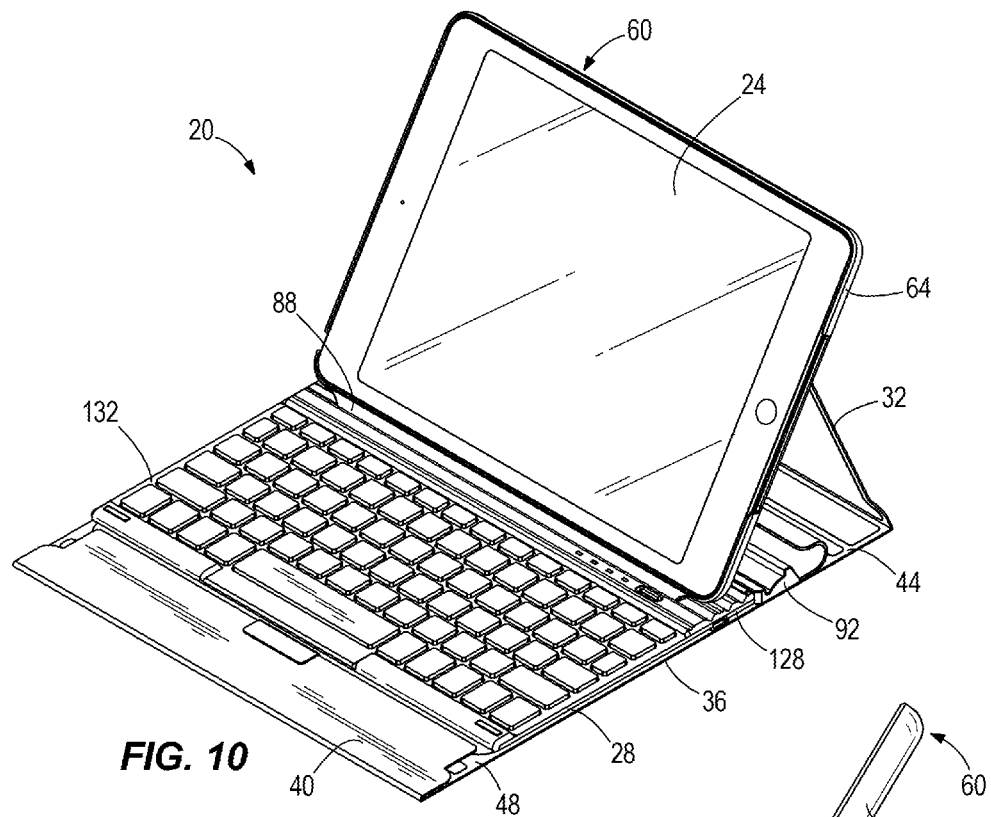
FIG. 10 is a perspective view of the case in a fourth operating position.

The illustrated spine component 92 includes a receiving tray 96 and a rounded spine support 100. The receiving tray 96 and the spine support 100 may be molded as separate pieces and later connected together, or may be initially molded together as a single piece. The receiving tray 96 defines a groove 104 that extends along the length of the tray 96 generally parallel to the bottom edge of the shell 64. The groove 104 is configured to receive the rib 88 of the shell 64 to support the first cover portion 32 in the first operating position, as shown in FIGS. 3-5. When the rib 88 is received in the groove 104, the shell 64 and the portable electronic device 24 are supported at an oblique angle of about 68 degrees relative to the keyboard 28. In other embodiments, the oblique angle may be relatively larger or smaller (e.g., between about 45 degrees and about 80 degrees).

As shown in FIG. 5, the groove 104 is contoured to match the contour of the shell 64. The groove 104 includes a relatively deep portion 108 that receives the rib 88 of the shell 64 and a relatively shallow portion 112 that provides clearance for the back wall 68 of the shell 64. In the illustrated embodiment, the receiving tray 96 includes a single groove such that the receiving tray 96 is only configured to support the shell 64 in one, discrete operating position. In other embodiments, the receiving tray 96 may include a plurality of grooves that are arranged in parallel and are configured to receive the rib 88 of the shell 64 to support the shell 64 in more than one different operating positions.

In some embodiments, the receiving tray 96 may include one or more magnets embedded in the rigid spine component 92 adjacent the groove 104 such that the spine component 92 is magnetized. In such embodiments, the magnets in the spine component 92 interact with and magnetically engage the magnets in the rib 88 of the shell 64. For example, the magnets in the spine component 92 and the magnets in the rib 88 interact with each other when the case 20 is in the first operating position (FIG. 3) to create a positive engagement between the shell 64 and the rigid spine component 92. When engaging, the magnets also provide an audible "click" to a user to reassure the user of a proper connection.

As shown in FIG. 2, the rounded spine support 100 extends from the receiving tray 96 toward the first spine portion 44. The spine support 100 has a height that is generally equal to a combined thickness of the portable electronic device 24 and the keyboard 28. As such, when the case 20 is moved to the closed position (FIG. 1), the first spine portion 44 wraps flushly around the spine support 100 so that the first cover portion 32 is generally parallel to (yet above in FIG. 1) the second cover portion 36. The spine support 100 engages the first spine portion 44 to keep the first spine portion 44 from collapsing in on itself. The spine support 100 also inhibits the cover portions 32, 36 from twisting, skewing, or parallelogramming relative to each other when the case 20 is closed and being carried by a user.

In the illustrated embodiment, the rounded spine support 100 includes a stylus holder 116. The stylus holder 116 includes two spaced apart arms 120 that surround and engage a portion of a stylus 124. The stylus 124 is insertable into the holder 116 such that the arms 120 secure around the stylus 124 with a snap-fit engagement. Similarly, the stylus 124 is removable from the holder 116 by pulling the stylus 124 out from between the arms 120 with sufficient force to temporarily deflect the arms 120 away from each other. In other embodiments, the stylus holder 116 may be omitted from the rounded spine support 100.

Figure 12:
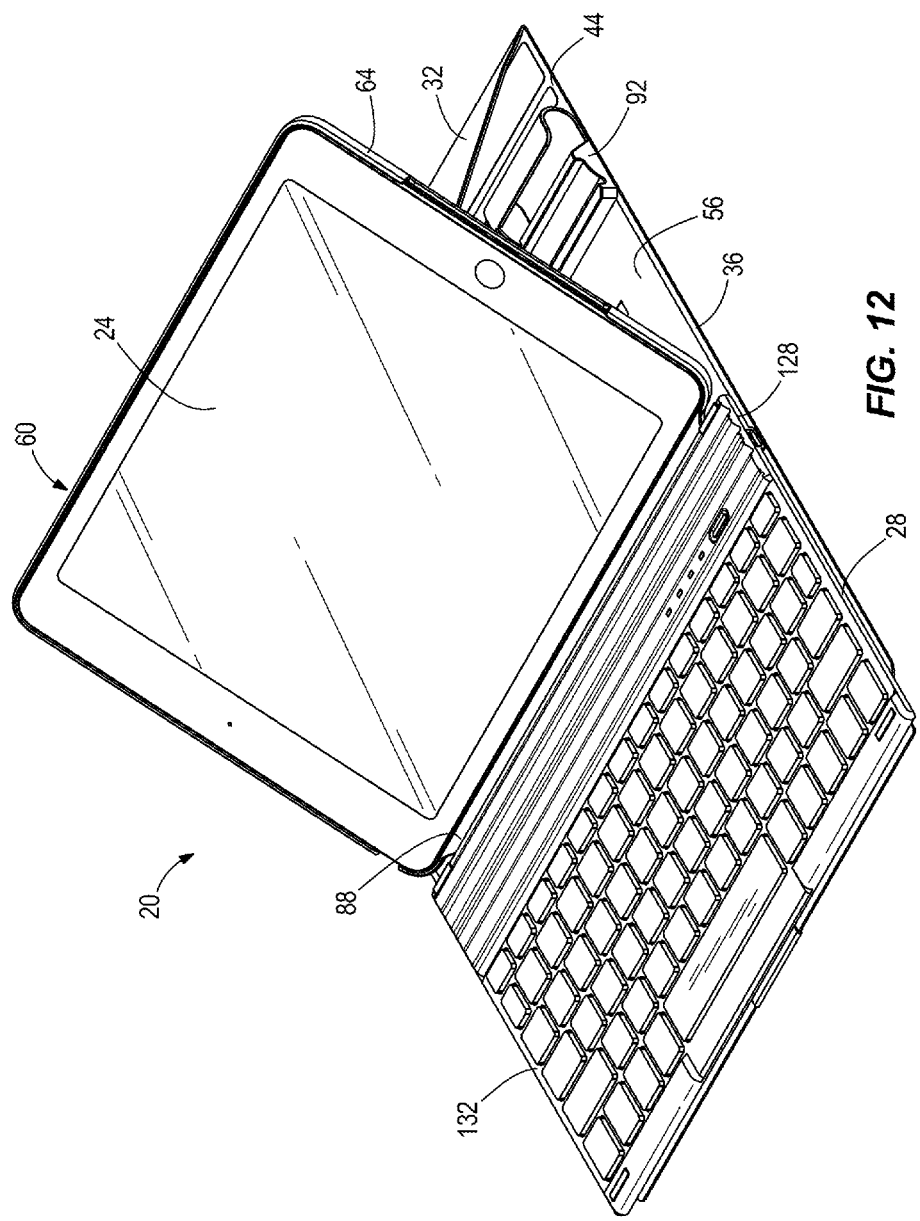
FIG. 12 is a perspective view of the case in a fifth operating position.
Figure 13:
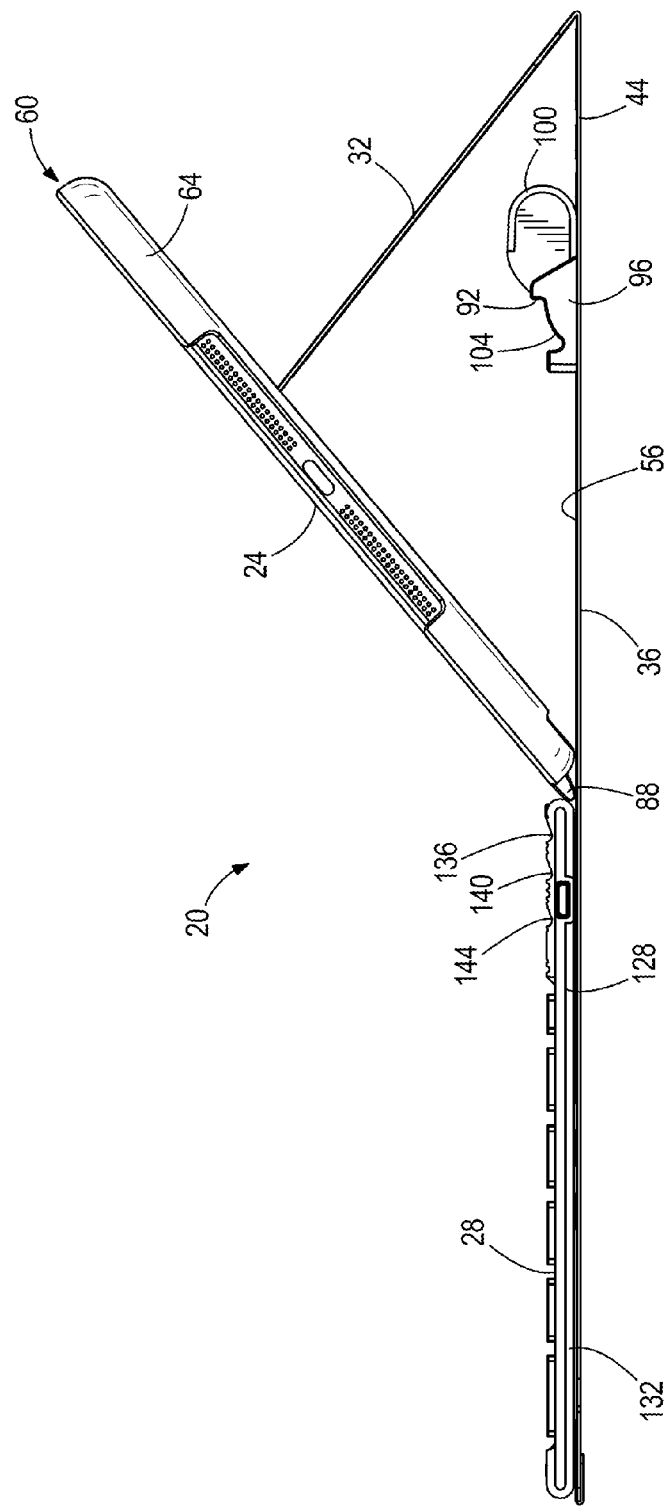
FIG. 13 is a side view of the case in the fifth operating position.

As shown in FIG. 2, the keyboard 28 is supported on the inner surface 56 of the second cover portion 36 adjacent the rigid spine component 92. The illustrated keyboard 28 is a magnetic keyboard that includes one or more magnets adjacent its lower surface. A magnetic plate may be embedded in the second cover portion 36 of the case 20 to interact with the magnets in the keyboard 28. The magnets and the magnetic plate allow the keyboard 28 to be moved along and repositioned on the second cover portion 36 relative to the rigid spine component 92. For example, the keyboard 28 can be positioned to directly abut the spine component 92 (as shown in FIGS. 1-11), can be positioned spaced apart from the spine component 92 (as shown in FIGS. 12 and 13), or can be removed entirely from the second cover portion 36. In the illustrated embodiment, the keyboard 28 is infinitely adjustable along the length of the second cover portion 36 (e.g., between the first spine portion 44 and the second spine portion 48) relative to the rigid spine component 92. In other embodiments, the position of the keyboard 28 may be limited to a plurality of discrete positions on the second cover portion 36. Additionally or alternatively, one or more magnets (rather than the metal plate) may be embedded in the second cover portion 36 to interact with the magnets in the keyboard 28.

The illustrated keyboard 28 includes a support portion 128 extending from a conventional keyboard area 132. The support portion 128 is located at an end of the conventional keyboard area 132 closest to the rigid spine component 92. The support portion 128 defines a plurality of grooves 136, 140, 144 that are generally parallel to the groove 104 in the spine component 92. Similar to the groove 104 in the rigid spine component 92, the grooves 136, 140, 144 in the support portion 128 of the keyboard 28 are configured to receive the rib 88 of the shell 64. As shown in FIGS. 6-11, the grooves 136, 140, 144 provide additional operating positions for the first cover portion 32 relative to the second cover portion 36 (and, thereby, additional viewing angles of the portable electronic device 24 relative to the keyboard 28). In the illustrated embodiment, the support portion 128 defines three grooves 136, 140, 144 that provide three different operating positions of the case 20. In other embodiments, the support portion 128 of the keyboard 28 may define fewer or more grooves to provide fewer or more operating positions for the case 20.

Figure 11:
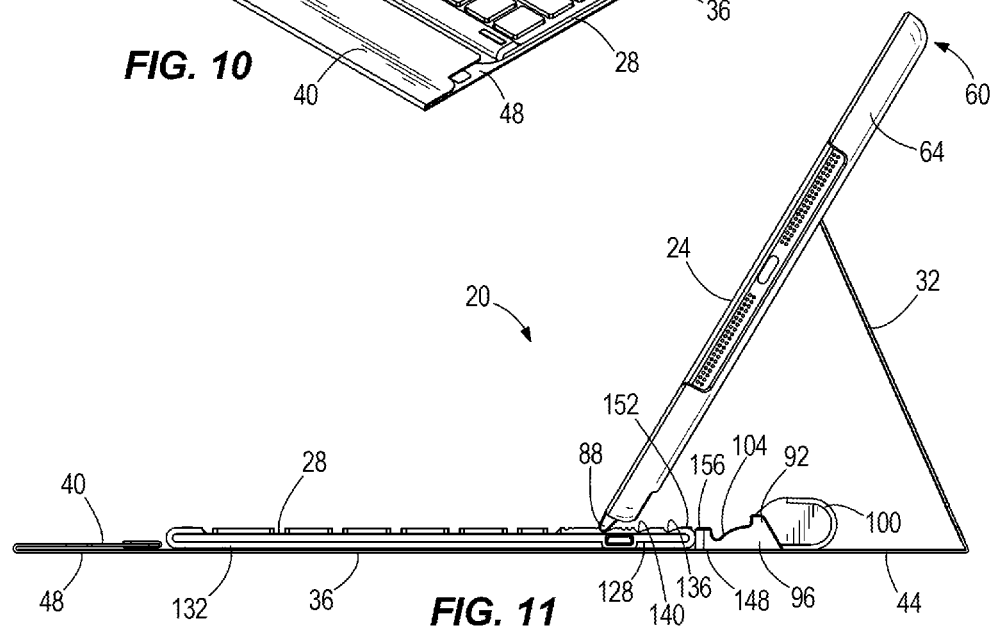
FIG. 11 is a side view of the case in the fourth operating position.

As shown in FIG. 11, the support portion 128 of the keyboard 28 has a height or thickness that is generally the same as a height or thickness at an end 148 of the receiving tray 96 of the rigid spine component 92 that abuts the keyboard 28. As such, an upper surface portion 152 of the support portion 128 (i.e., the surface of the support portion 128 facing away from the second cover portion 36) is generally coplanar with an upper surface portion 156 of the end 148 of the receiving tray 96 (i.e., the surface of the receiving tray 96 facing away from the second cover portion 36). As such, when the keyboard 28 abuts the rigid spine component 92, the keyboard 28 and the spine component 92 appear to be a single structure with a continuous upper surface, as shown in FIG. 2. The continuous upper surface formed by the combined keyboard 28 and spine component 92 defines the grooves 104, 136, 140, 144 (at least one of which is formed in the spine component 92, and at least one of which is formed in the keyboard 28) for providing multiple operating positions of the case 20.

As discussed above, the keyboard 28 is movable along the second cover portion 36 to change a position of the keyboard 28 relative to the rigid spine component 92. By moving the keyboard 28 away from the spine component 92, even more operating positions of the case 20 and viewing angles of the portable electronic device 24 may be realized. For example, the keyboard 28 may be moved away from the spine component 92, and then the rib 88 of the shell 64 may be positioned within one of the grooves 136, 140, 144 of the keyboard 28 to achieve an operating position with an even shallower viewing angle of the portable electronic device 24. Since the position of the keyboard 28 on the second cover portion 36 is infinitely adjustable, nearly any viewing angle of the portable electronic device 24 relative to the keyboard 28 may be realized.

In addition, as shown in FIGS. 12 and 13, the rib 88 of the shell 64 may be supported directly on the inner surface 56 of the second cover portion 36 rather than on either the rigid spine component 92 or on the keyboard 28. When the keyboard 28 is moved away from the rigid spine component 92, a portion of the inner surface 56 of the second cover portion 36 becomes exposed. As such, the rib 88 of the shell 64 can be positioned to contact a portion of the inner surface 56 of the second cover portion 36 between the spine component 92 and the keyboard 28. The rib 88 also contacts and abuts against an edge of the support portion 128 of the keyboard 28. Such an arrangement inhibits the rib 88 from sliding along the inner surface 56 of the second cover portion 36. Furthermore, in embodiments where the rib 88 includes magnets and the second cover portion 36 includes a metal plate, the magnets in the rib 88 can interact with and engage the metal plate to help hold the rib 88, and thereby the shell 64 and the portable electronic device 24, in place relative to the keyboard 28.

In some embodiments, the second cover portion 36 may removably support another accessory unit rather than the keyboard 28. For example, the second cover portion 36 may support a storage module having slots and/or recesses for storing business cards, pens, pencils, paper clips, note cards, USB drives, and the like. Alternatively, the second cover portion 36 may support a writing pad utility having a frame for supporting a notepad. In such embodiments, the alternative accessory units may still include support portions similar to the support portion 128 of the keyboard 28 to support the shell 64 and the portable electronic device 24 at a plurality of different viewing angles relative to the accessory units.

Although the invention has been described with reference to certain preferred embodiments, variations and modifications exist within the scope and spirit of one or more independent aspects of the invention.

The invention claimed is:
1. A case for a portable electronic device and a keyboard, the case comprising:
   a first cover portion;
   an engagement member secured to the first cover portion and configured to support the portable electronic device;
   a second cover portion configured to support the keyboard;
   a spine portion connecting the first cover portion to the second cover portion, the spine portion allowing movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard; and
   a rigid spine component coupled to the second cover portion adjacent the spine portion, the rigid spine component including a groove configured to receive a portion of at least one of the engagement member and the portable electronic device when the case is in the operating position,
wherein the rigid spine component includes a receiving tray and a rounded spine support, wherein the receiving tray defines the groove, wherein the rounded spine support extends from the receiving tray toward the spine portion, and wherein the rounded spine support includes a stylus holder.

2. The case of claim 1, wherein the engagement member includes a shell secured to the first cover portion, wherein the shell is configured to receive the portable electronic device.

3. The case of claim 2, wherein the shell includes a rib formed along a bottom edge of the shell, and wherein the rib is received in the groove of the rigid spine component when the case is in the operating position.

4. The case of claim 3, wherein the rib of the shell is magnetized, and wherein the rib magnetically engages the rigid spine component when received in the groove.

5. The case of claim 1, wherein the rounded spine support engages the spine portion when the case is in the closed position.

6. The case of claim 1, wherein the second cover portion includes at least one of a metal plate and a magnet, and wherein the at least one of the metal plate and the magnet is configured to magnetically engage the keyboard.

7. The case of claim 6, wherein the at least one of the metal plate and the magnet is configured to enable repositioning of the keyboard along the second cover portion relative to the rigid spine component.

8. A case assembly for a portable electronic device, the case assembly comprising:
a keyboard configured to communicate with the portable electronic device; and
a case including
a first cover portion,
an engagement member secured to the first cover portion and configured to support the portable electronic device,
a second cover portion supporting the keyboard, and
a spine portion connecting the first cover portion to the second cover portion, the spine portion allowing movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard;
wherein the keyboard includes a groove configured to receive a portion of at least one of the engagement member and the portable electronic device when the case is in the operating position,
wherein the case further includes a rigid spine component coupled to the second cover portion adjacent the spine portion, and wherein the rigid spine component engages the spine portion when the case is in the closed position, and
wherein the rigid spine component includes a receiving tray that defines a groove that is configured to receive the portion of at least one of the engagement member and the portable electronic device when the case is in another operating position.

9. The case assembly of claim 8, wherein the keyboard defines a plurality of grooves, and wherein each groove is configured to receive the portion of at least one of the engagement member and the portable electronic device to position the case in different operating positions.

10. The case assembly of claim 8, wherein the keyboard includes a conventional keyboard area and a support area, wherein the support area extends from the conventional keyboard area toward the spine portion of the case and defines the groove.

11. The case assembly of claim 8, wherein the engagement member includes a shell secured to the first cover portion, and wherein the shell is configured to receive the portable electronic device.

12. A case assembly for a portable electronic device, the case assembly comprising:
a keyboard configured to communicate with the portable electronic device; and
a case including
a first cover portion,
an engagement member secured to the first cover portion and configured to support the portable electronic device,
a second cover portion supporting the keyboard, and
a spine portion connecting the first cover portion to the second cover portion, the spine portion allowing movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard;
wherein the keyboard includes a groove configured to receive a portion of at least one of the engagement member and the portable electronic device when the case is in the operating position,
wherein the engagement member includes a shell secured to the first cover portion, and wherein the shell is configured to receive the portable electronic device,
wherein the shell includes a rib formed along a bottom edge of the shell, and wherein the rib is received in the groove of the keyboard when the case is in the operating position.

13. The case assembly of claim 8, wherein the keyboard is a magnetic keyboard, wherein the second cover portion of the case includes at least one of a metal plate and a magnet, and wherein the at least one of the metal plate and the magnet magnetically engages the magnetic keyboard.

14. The case assembly of claim 13, wherein the magnetic keyboard is repositionable along the second cover portion.

15. The case assembly of claim 8, wherein the keyboard abuts the rigid spine component.

16. A case assembly for a portable electronic device, the case assembly comprising:
a keyboard configured to communicate with the portable electronic device; and
a case including
a first cover portion,
an engagement member secured to the first cover portion and configured to support the portable electronic device,
a second cover portion supporting the keyboard, and a spine portion connecting the first cover portion to the second cover portion, the spine portion allowing movement of the first cover portion relative to the second cover portion so that the case is positionable in a closed position, in which the first cover portion generally overlies the second cover portion to substantially cover the portable electronic device and the keyboard, and in an operating position, in which at least a portion of the first cover portion is angled relative to the second portion such that the portable electronic device is accessible and supported at an oblique angle relative to the keyboard;

wherein the keyboard includes a groove configured to receive a portion of at least one of the engagement member and the portable electronic device when the case is in the operating position, wherein the case further includes a rigid spine component coupled to the second cover portion adjacent the spine portion, and wherein the rigid spine component engages the spine portion when the case is in the closed position wherein the keyboard abuts the rigid spine component, and wherein an upper surface portion of the keyboard is generally coplanar with an adjacent upper surface portion of the rigid spine component such that the keyboard and the rigid spine component appear to be continuous.

* * * * *